(12) United States Patent
Hwang et al.

(10) Patent No.: US 9,160,461 B2
(45) Date of Patent: Oct. 13, 2015

(54) SYSTEMS AND METHODS FOR MINIMIZING SPURS THROUGH DUTY CYCLE ADJUSTMENT

(71) Applicant: QUALCOMM Incorporated, San Diego, CA (US)

(72) Inventors: Justin A. Hwang, Mountain View, CA (US); David Su, Saratoga, CA (US)

(73) Assignee: Qualcomm Incorporated, San Diego, CA (US)

( * ) Notice: Subject to any disclaimer, the term of this patent is extended or adjusted under 35 U.S.C. 154(b) by 252 days.

(21) Appl. No.: 13/738,917

(22) Filed: Jan. 10, 2013

(65) Prior Publication Data

US 2014/0194076 A1    Jul. 10, 2014

(51) Int. Cl.
*H04B 1/40* (2015.01)
*H04B 15/00* (2006.01)
*H04B 1/04* (2006.01)
*H04B 15/06* (2006.01)

(52) U.S. Cl.
CPC .............. *H04B 15/00* (2013.01); *H04B 1/0475* (2013.01); *H04B 15/06* (2013.01)

(58) Field of Classification Search
CPC ........ H04W 16/14; H04W 28/04; H04B 1/40; H04B 15/00; H04B 1/405; H04B 1/3822; H04B 1/406; H04B 1/44; H04B 1/54; H04B 1/48; H04B 1/525; H04B 1/18
USPC ........... 455/63.1, 67.11, 67.13, 77, 550.1, 78, 455/114.1–114.3, 115.1, 255–260, 296, 455/313, 334
See application file for complete search history.

(56) References Cited

U.S. PATENT DOCUMENTS

| | | | |
|---|---|---|---|
| 5,291,428 A | 3/1994 | Twitchell et al. | |
| 6,122,323 A * | 9/2000 | Johnson | 375/259 |
| 6,694,104 B1 * | 2/2004 | Caplan et al. | 398/197 |
| 6,977,556 B1 | 12/2005 | Petrovic et al. | |
| 7,109,766 B2 | 9/2006 | White et al. | |
| 7,302,237 B2 | 11/2007 | Jackson et al. | |
| 7,463,903 B2 * | 12/2008 | Boarin et al. | 455/553.1 |
| 7,929,929 B2 | 4/2011 | Gailus et al. | |
| 8,134,393 B1 | 3/2012 | Nagaraj et al. | |
| 2003/0080792 A1 * | 5/2003 | Azmoodeh | 327/175 |
| 2003/0112083 A1 | 6/2003 | Atallah et al. | |
| 2013/0257508 A1 | 10/2013 | Goel et al. | |

OTHER PUBLICATIONS

International Search Report and Written Opinion—PCT/US2014/010155—ISA/EPO—May 19, 2014.

* cited by examiner

*Primary Examiner* — Nhan Le
(74) *Attorney, Agent, or Firm* — Bay Area Technology Law Group PC

(57) ABSTRACT

A frequency source, such as for a wireless communications device, configured to have a duty cycle adjustment. A selected harmonic spur resulting from operation of the frequency source at one duty cycle may be avoided or minimized by operating the frequency source at a second duty cycle. Determination of the appropriate duty cycle may be based on measuring the amplitude of the harmonic spur as it appears in the output of a receive chain of the wireless device. Alternatively, the duty cycle may be set to desired value to avoid or minimize a given harmonic.

26 Claims, 5 Drawing Sheets

SYSTEMS AND METHODS FOR MINIMIZING SPURS THROUGH DUTY CYCLE ADJUSTMENT

FIELD OF THE PRESENT INVENTION

This disclosure generally relates to frequency sources and more specifically to techniques for rapidly minimizing harmonic spurs resulting from such frequency sources.

BACKGROUND OF THE INVENTION

Modern electronic circuits rely heavily on frequency sources for many applications. For example, radio frequency (RF) signals may be generated from a reference frequency source to convert a baseband signal to and from the higher frequency used to transmit the signal in wireless communication systems. Digital electronic circuits also depend upon frequency sources to generate a stable clock signal to control the operation of synchronous elements such as logic gates.

A notable characteristic of oscillating frequency sources such as crystal oscillators is the potential for unwanted leakage of harmonic energy into other circuit elements, creating spurious signals or "spurs." The problems posed by these aggressor signals are exacerbated by trends in circuit design to integrate multiple analog and digital functions into a single chip, such as in system-on-a-chip (SoC) applications. The presence of unwanted spurs may result in a performance degradation of the wireless communications system. For example, spurs that couple into the receive chain of a wireless transceiver may be manifest as interference that reduces sensitivity and inhibits the ability to properly process the signal. Similarly, spurs coupling into the transmit chain may be inadvertently transmitted, resulting in interference with other devices. In light of these deleterious effects, minimization or mitigation of spurs is an important design consideration.

Different techniques for addressing problems associated with harmonic spurs exist, but typically involve undesirable compromises. For example, attempts may be made to filter a received signal at frequencies known to contain unwanted harmonic components. However, such techniques may also attenuate desired components of the received signal. Other techniques may include attempts to reduce the amplitude of a spur by injecting a cancelling tone, which may require additional circuitry and power consumption.

In particular, spurs that appear at the input of the low noise amplifier (LNA) of a receive chain may be especially problematic. To help reduce the degradation that results from such spurs, the LNA may be designed with a differential topology, requiring additional circuit area and power as compared to a single-ended topology. Further, transceiver architectures and operational frequencies that would otherwise be advantageous may be avoided in an attempt to minimize the undesirable effects of spurs.

Accordingly, there is a need for systems and methods of providing a frequency source that minimizes the impact of harmonic spurs. Likewise, there is a need for a frequency source that imposes fewer constraints on the design of a wireless communications device. This invention satisfies these and other needs.

SUMMARY OF THE INVENTION

This specification discloses methods for reducing a harmonic spur including operating a frequency source at a first duty cycle such that the harmonic spur has a first amplitude at the first duty cycle and operating the frequency source at a second duty cycle, such that the harmonic spur has a second amplitude at the second duty cycle, wherein the second amplitude is less than the first amplitude. The second duty cycle may correspond to an integer multiple of a reciprocal of an order of the harmonic spur. The second duty cycle may correspond to an integer multiple of a reciprocal of an order of the harmonic spur.

In one aspect, the methods may also include detecting an amplitude of the harmonic spur and adjusting the second duty cycle until the second amplitude of the harmonic spur is less than a threshold. Further, detecting the amplitude of the harmonic spur may include analyzing an output of a receive chain coupled to the frequency source.

In another aspect, the methods may also include measuring a duty cycle of the frequency source and adjusting operation of the frequency source until the frequency source operates at the second duty cycle.

The disclosure is also directed to systems for adjusting the duty cycle of a frequency source. For example, a suitable frequency source may include a duty cycle module, wherein when operation of the frequency source at a first duty cycle generates a harmonic spur having a first amplitude, the duty cycle module is configured to operate the frequency source at a second duty cycle, such that the harmonic spur has a second amplitude at the second duty cycle, wherein the second amplitude is less than the first amplitude. As desired, the second duty cycle may correspond to an integer multiple of a reciprocal of an order of the harmonic spur.

In one aspect, the frequency source may include a duty cycle control module configured to detect an amplitude of the harmonic spur and adjust the second duty cycle until the second amplitude is less than a threshold. Further, the duty cycle control module may detect the amplitude of the harmonic spur by analyzing an output of a receive chain coupled to the frequency source.

In another aspect, the frequency source may include a duty cycle measurement unit configured to determine a duty cycle of the frequency source, such that the duty cycle module may adjust the duty cycle of the frequency source until the duty cycle measurement unit determines the frequency source is operating at the second duty cycle.

This disclosure also includes methods of operating a wireless communications device, including operating a frequency source, wherein energy from the frequency source couples to a receive chain of the wireless communications device to generate a harmonic spur having a first amplitude when the frequency source operates at a first duty cycle and operating the frequency source at a second duty cycle, such that the harmonic spur has a second amplitude at the second duty cycle, wherein the second amplitude is less than the first amplitude. As noted, the second duty cycle may correspond to an integer multiple of a reciprocal of an order of the harmonic spur.

In one aspect, such methods may include detecting an amplitude of the harmonic spur and adjusting the second duty cycle until the second amplitude of the harmonic spur is less than a threshold. The second duty cycle may be stored as corresponding to an operational condition of the wireless communications device. Further, the second duty cycle may be retrieved from storage based on an operational condition of the wireless communications device, wherein the second duty cycle was determined previously. Additionally, detecting the amplitude of the harmonic spur may include analyzing an output of the receive chain.

In another aspect, the methods may also involve measuring a duty cycle of the frequency source and adjusting operation of the frequency source until the frequency source operates at the second duty cycle. Further, the second duty cycle may be retrieved from storage based on an operational condition of the wireless communications device.

Additionally, the systems of this disclosure may include wireless communications devices. For example, a suitable wireless communications device may include a receive chain, a frequency source and a duty cycle module, wherein operation of the frequency source at a first duty cycle generates a harmonic spur that couples to the receive chain having a first amplitude at the first duty cycle and wherein the duty cycle module may operate the frequency source at a second duty cycle, such that the harmonic spur has a second amplitude at the second duty cycle and the second amplitude is less than the first amplitude. As desired, the second duty cycle may correspond to an integer multiple of a reciprocal of an order of the harmonic spur.

In one aspect, the wireless communications device may also include a duty cycle control module to detect an amplitude of the harmonic spur and adjust the second duty cycle until the second amplitude of the harmonic spur is less than a threshold. The duty cycle control module may be configured to store the second duty cycle as corresponding to an operational condition of the wireless communications device or to retrieve the second duty cycle from storage based on an operational condition of the wireless communications device, wherein the second duty cycle was determined previously. Additionally, the duty cycle control module may detect the amplitude of the harmonic spur by analyzing an output of the receive chain.

In another aspect, the wireless communications device may also include a duty cycle measurement unit to determine a duty cycle of the frequency source, such that the duty cycle module may adjust the duty cycle of the frequency source until the duty cycle measurement unit determines the frequency source is operating at the second duty cycle. Further, the duty cycle module may retrieve the second duty cycle from storage based on an operational condition of the wireless communications device.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
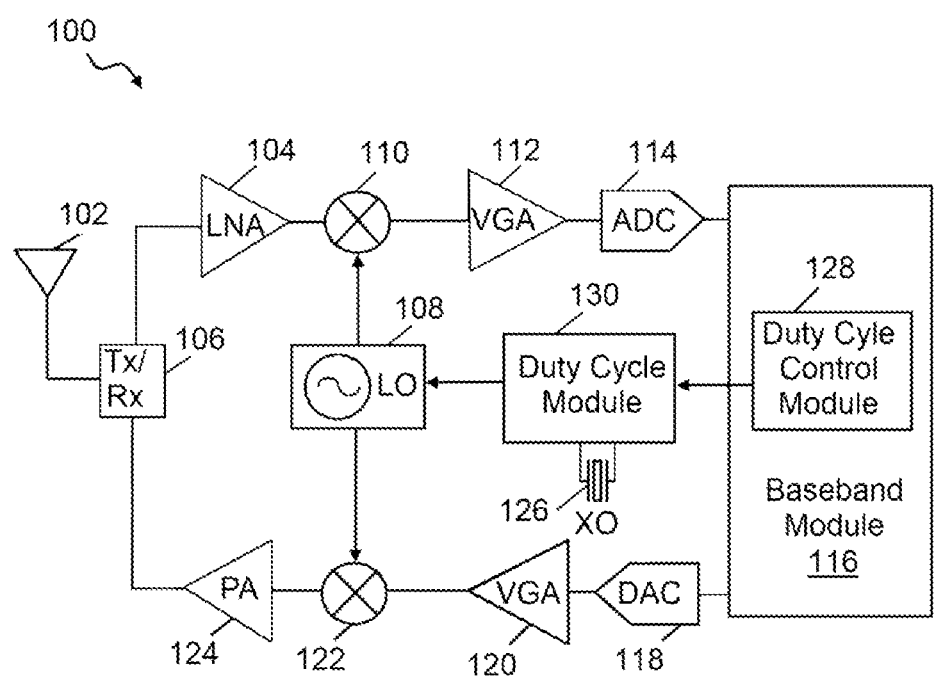
FIG. 1 schematically depicts functional blocks of a wireless transceiver having a frequency source with duty cycle adjustment, according to an embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the invention in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

"Complementary logic," which refers to logic circuitry involving both P-channel and N-channel transistors, is often more commonly referred to as CMOS (Complementary Metal Oxide Semiconductor) logic even though the transistors making up the logic circuitry may not have metal gates and may not have oxide gate dielectrics.

The terms second level and first level, high and low and 1 and 0, as used in the following description may be used to describe various logic states as known in the art. Particular voltage values of the second and first levels are defined arbitrarily with regard to individual circuits. Furthermore, the voltage values of the second and first levels may be defined differently for individual signals such as a clock and a digital data signal. Although specific circuitry has been set forth, it will be appreciated by those skilled in the art that not all of the disclosed circuitry is required to practice the invention. Moreover, certain well known circuits have not been described, to maintain focus on the invention. Similarly, although the description refers to logical "0" and logical "1" or low and high in certain locations, one skilled in the art appreciates that the logical values can be switched, with the remainder of the circuit adjusted accordingly, without affecting operation of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

Unless defined otherwise, all technical and scientific terms used herein have the same meaning as commonly understood by one having ordinary skill in the art to which the disclosure pertains.

Finally, as used in this specification and the appended claims, the singular forms "a", "an" and "the" include plural referents unless the content clearly dictates otherwise.

As described above, oscillating frequency sources may have harmonic energy that couples to other circuit elements. The resulting spurs may be characterized in terms of the duty cycle exhibited by the frequency source. Specifically, the coefficients $c_n$ for the n-th harmonic of a rectangular pulse train having a duty cycle d and amplitude A may be expressed as equation (1):

$$c_n = A*d*\mathrm{sinc}(n*d), \text{ for } n=0,\pm 1,\pm 2, \quad (1)$$

Since the value of the sinc function is null when its argument is an integer, the amplitude of the n-th harmonic may be minimized when the product of n and d is an integer. This relationship may be expressed as equation (2):

$$d = k/n \text{ for } k=0,\pm 1,\pm 2, \quad (2)$$

As indicated by the above equations, the energy of a given harmonic spur may be minimized when the duty cycle is an integer multiple of the reciprocal of the harmonic number. For example, at a duty cycle of 50%, any even order harmonic may have a minimized magnitude while any odd order harmonic may have a maximized magnitude. Accordingly, this disclosure is directed to adjusting the duty cycle of a frequency source to selectively suppress unwanted harmonic spurs by exploiting this relationship.

One suitable embodiment of a frequency source having an adjustable duty cycle is depicted in reference to wireless communications device 100 as shown in FIG. 1. Wireless communications device 100 may be configured as a transceiver for use in a suitable wireless communications system, such as a wireless local area network (WLAN) system adhering to 802.11 protocols established by Institute of Electrical and Electronic Engineers (IEEE) and correspondingly may operate on channels associated with 2.4 GHz, 5 GHz, 60 GHz or other suitable frequency bands.

In this simplified example, wireless communications device 100 employs a direct conversion architecture and may generally include a receive chain such that an information signal transmitted at RF may be received by antenna 102 and selectively coupled to LNA 104 by transmit/receive (Tx/Rx) switch 106. The amplified signal is downconverted to baseband frequency by combination with a suitable frequency signal output by local oscillator (LO) 108 at mixer 110. The downconverted signal may then be fed through variable gain amplifier (VGA) 112, digitized by analog to digital converter (ADC) 114 and delivered to baseband module 116 for further processing and demodulation to recover the transmitted information. Similarly, a digital information stream generated by baseband module 116 may be converted to a corresponding analog signal by digital to analog converter (DAC) 118 and then fed to VGA 120. The baseband frequency signal output by VGA 120 may then be upconverted at mixer 122 to RF for transmission by combining the baseband frequency signal with the frequency signal output by LO 108. The upconverted signal is amplified by power amplifier (PA) 124 and selectively coupled to antenna 102 by Tx/Rx switch 106.

LO 108 may be implemented using any suitable design, such as through a voltage controlled oscillator (VCO) in a phase locked loop (PLL) architecture. In the embodiment shown, LO 108 is configured to output a signal at a frequency suitable for upconverting and downconverting the information signal between RF and baseband frequency. In other embodiments, such as those featuring an intermediate frequency (IF) architecture, a plurality of LOs may be employed as desired. LO 108 is controlled by a reference frequency signal generated by a suitable frequency source, such as crystal oscillator (XO) 126. As shown, duty cycle control module 128 is implemented as a functional block of baseband module 116 and operates duty cycle module 130 to adjust the duty cycle of the frequency signal output of XO 126. Duty cycle module 130 may be implemented in any suitable manner as desired, including through the use of one or more programmable delay lines, a clock filter or any other suitable means.

Depending upon aspects of the design of wireless communications device 100, such as the topology of LNA 104, harmonic energy resulting from operation of XO 126 may couple to elements of wireless communications device 100 and be present at the input of LNA 104, such that the spur or spurs may be amplified by LNA 104 and represent an unwanted component of the baseband signal delivered to baseband module 116. Accordingly, duty cycle control module 128 may be configured to detect the presence of a harmonic spur that has coupled to the input of LNA 104 by analyzing the digitized signal fed to baseband module 116. Upon detection of an unwanted spur in the baseband signal, duty cycle control module 128 may also be configured to operate duty cycle module 130 to adjust the duty cycle of the signal received from XO 126 to a value that may minimize or eliminate the spur.

Figure 2:
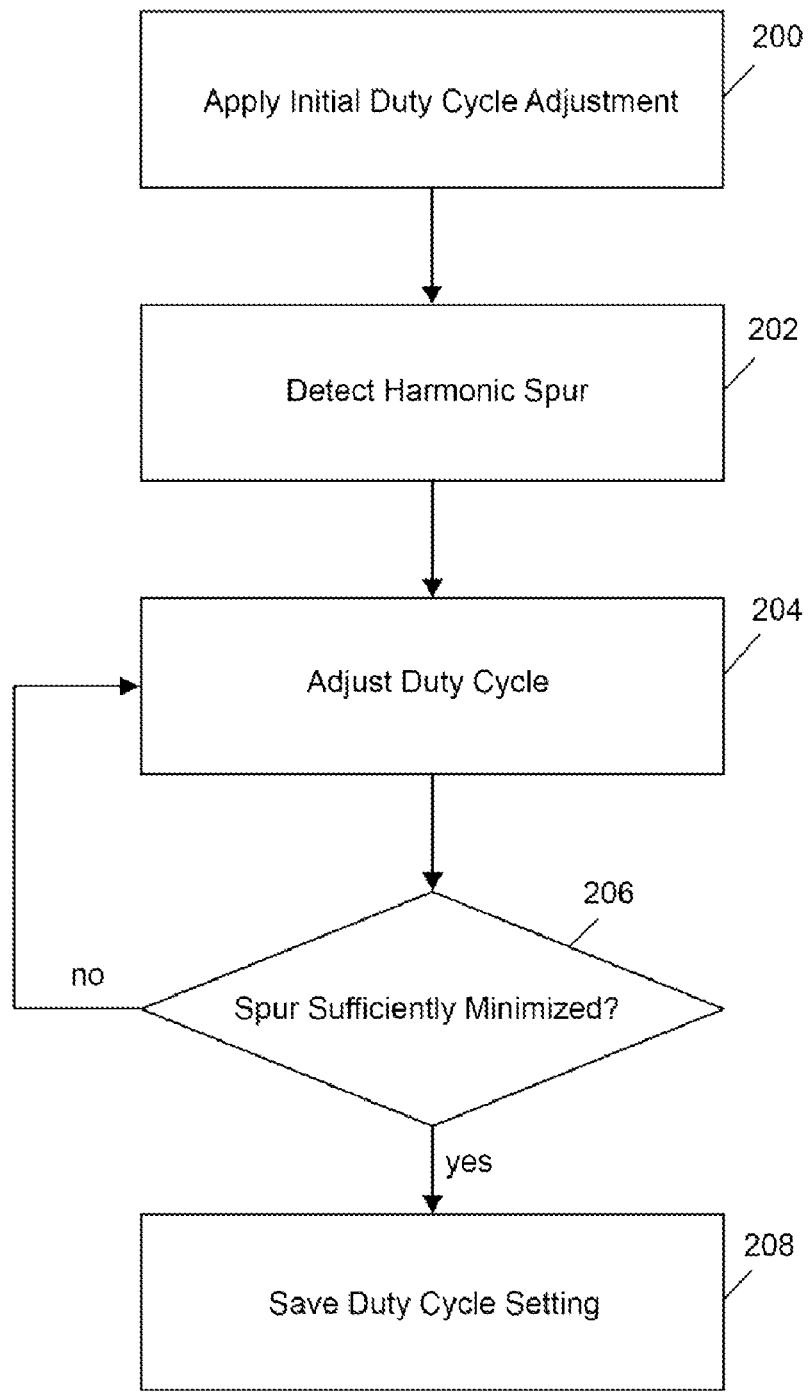
FIG. 2 depicts a flow chart representing a routine for adjusting the duty cycle of a frequency source to minimize spurs, according to the embodiment shown in FIG. 1.

One suitable routine for adjusting the duty cycle of XO 126 is represented by the flowchart depicted in FIG. 2. Beginning with step 200, duty cycle control module 128 may operate duty cycle module 130 at an initial setting. One suitable initial setting may correspond to operating duty cycle module 130 to output a frequency signal received from XO 126 at a nominal 50% duty cycle. Alternatively, an adjustment determined during a previous routine may be used as the initial setting and may be based on an operational condition of wireless communications device 100. For example, wireless communications device 100 may be configured to switch among a plurality of channels during operation. Different spurs may represent problematic interference depending upon which channel is being used, resulting in different optimal duty cycles for each channel. Accordingly, in one aspect, duty cycle control module 128 may directly apply a previously determined adjustment when wireless communications device 100 switches channels.

Duty cycle control module 128 may then detect the presence of an unwanted harmonic spur in the receive chain signal output to baseband module 116 as indicated by step 202. Next, duty cycle control module 128 operates duty cycle module 130 to change the duty cycle being output from a current value to a modified value as represented by step 204. In some embodiments, the modified value may be determined by iteratively adopting a greater deviation from a 50% duty cycle. In other embodiments, any suitable technique for determining the amount and direction of adjustment may be used as desired.

In step 206, duty cycle control module 128 may determine whether the duty cycle adjustment sufficiently minimized the spur. In one aspect, duty cycle control module 128 may determine whether the amplitude of the spur is below a predetermined threshold. In another aspect, duty cycle control module 128 may determine whether the amplitude of the spur increased relative to the previous adjustment. If so, this may be taken as an indication that a local minima with respect to the minimization of the spur has been achieved. As such, duty cycle control module 128 may return to the previous adjustment, or may iterate a further search involving adjustments in the opposite direction. Once the amplitude of the spur has been reduced below the threshold or a local minima has been determined, the routine may exit at step 208 and the appropriate duty cycle adjustment may be saved. Otherwise, the routine may loop to step 204 and duty cycle control module 128 may adjust the duty cycle output to a new value.

As desired, a duty cycle adjustment routine such as the one represented by FIG. 2 may be performed as a periodic background calibration. Accordingly, the duty cycle may be adjusted as an ongoing process to compensate for alteration of the duty cycle of XO 126 over time caused by, for example, variations in temperature and supply voltage. In another aspect, the background calibration routine may also be performed on other channels such that an appropriate duty cycle adjustment may be determined and stored, allowing the adjustment to be quickly implemented upon switching to a new channel as described above.

Figure 3:
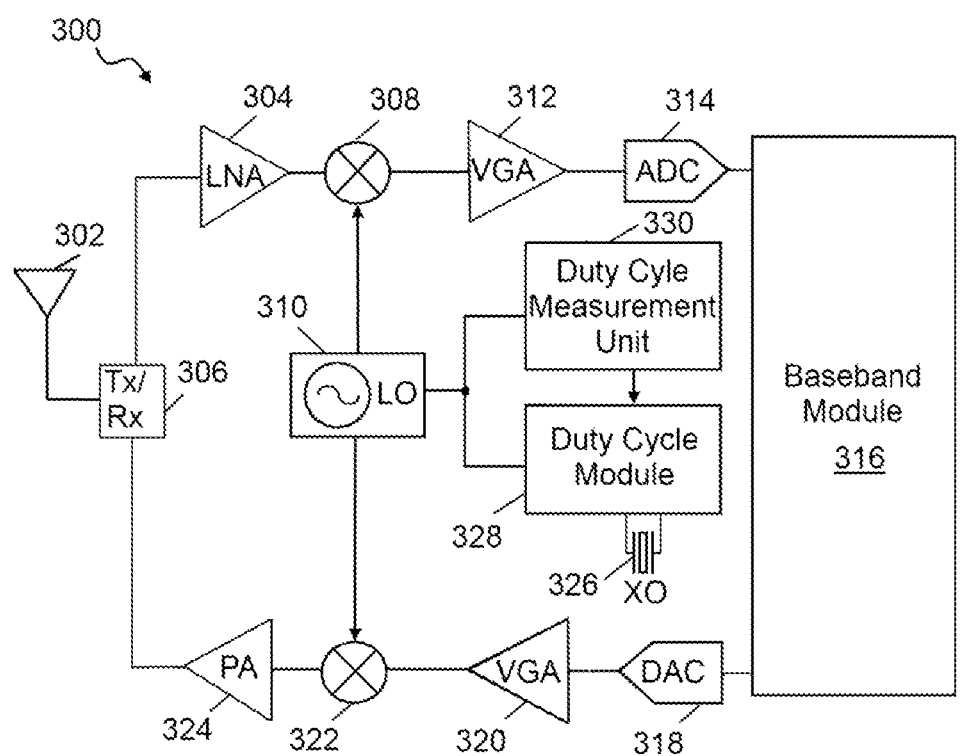
FIG. 3 schematically depicts functional blocks of a wireless transceiver having a frequency source with duty cycle adjustment, according to another embodiment of the invention.

In another aspect, the duty cycle of a frequency source may be adjusted directly to minimize spurs without detection. For example, another embodiment of a suitable frequency source having duty cycle adjustment is depicted with regard to wireless communications device 300 in FIG. 3. As shown, wireless communications device 300 employs a direct conversion architecture similar to that of wireless communications device 100, although other designs may also be used. In general, wireless communications device 300 features a receive chain including antenna 302, selectively coupled to LNA 304 by Tx/Rx switch 306. Mixer 308 downconverts the received signal with the output of LO 310. The baseband signal is then fed through VGA 312, digitized by ADC 314 and delivered to baseband module 316. In the corresponding transmit chain, the digital output from baseband module 316 is converted by DAC 318 and fed to VGA 320. Mixer 322 upconverts the baseband signal using the output from LO 310. The RF signal is then fed through PA 324 and selectively coupled to antenna 302 by Tx/Rx switch 306 for transmission.

LO 310 may be a PLL or other suitable frequency synthesizer, and is controlled by XO 326 or other suitable frequency source. In a similar manner to that described above, leakage of energy from XO 326 may result in a spur in the signal amplified by LNA 304. Further, energy from XO 326 may also couple to the transmit chain, resulting in amplification and transmission of the spur and causing out of band emissions in potential violation of regulatory requirements. Since the characteristics of spurs may depend upon the operating frequency and duty cycle of XO 326, duty cycle module 328 may be configured to adjust the duty cycle of the frequency signal generated by XO 326 to a desired value. As shown, output from duty cycle module 328 may be fed to LO 310 and to duty cycle measurement unit 330 to determine if the generated duty cycle matches the desired duty cycle. Correspondingly, a feedback signal from duty cycle measurement unit 330 may be used to adjust the duty cycle output by duty cycle module 328 to the desired value. Duty cycle measurement unit 330 may be implemented using a pulse width measurement technique, a high speed counter, or any other suitable means.

By selecting a duty cycle value associated with reduced or absent spurs at a frequency of interest, the effects of spurs on wireless communications device 300 correspondingly may be minimized or eliminated. Specifically, in view of equations (1) and (2) discussed above, duty cycle module 328 may be used to adjust the duty cycle of the frequency signal generated by XO 326 to be free of a given n-th order harmonic by outputting a frequency signal having a duty cycle that is an integer multiple of the reciprocal of n.

Figure 4:
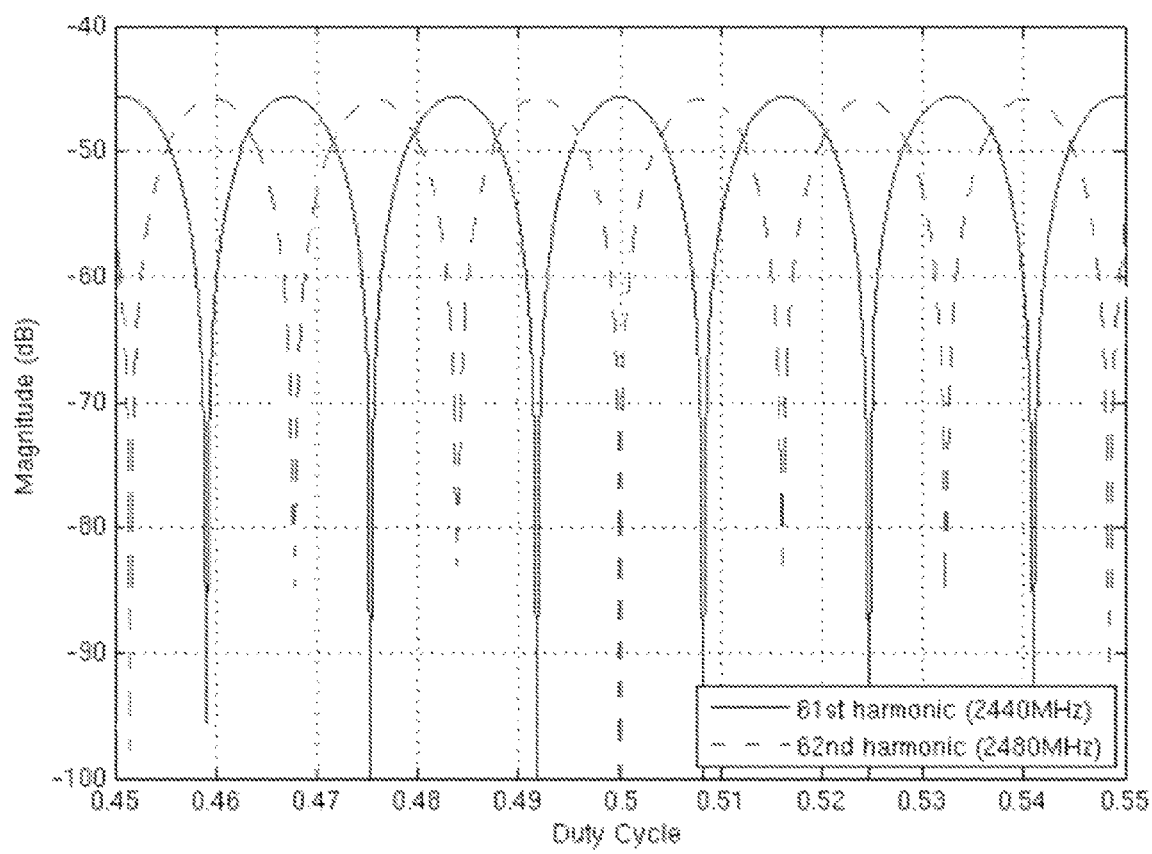
FIG. 4 is a graph depicting the relationship between selected harmonic spurs and duty cycle.

For example, when XO 326 is configured to operate at 40 MHz, the $61^{st}$ harmonic component is present at 2440 MHz. Since this spur falls within the Industrial, Scientific and Medical (ISM) frequency band used by 2.4 GHz 802.11 wireless networks, this spur may degrade performance of a wireless communications device. In particular, since the $61^{st}$ harmonic is an odd harmonic, operation at a 50% duty cycle square wave may result in the energy of the harmonic being maximized. FIG. 4 is a graph that plots the magnitude of the $61^{st}$ harmonic against duty cycle. For comparison, FIG. 4 also depicts the $62^{nd}$ harmonic, which is present at 2480 MHz. Accordingly, duty cycle module 328 may be configured to output a frequency signal at 40 MHz with a duty cycle set to approximately $0.5 \pm 1/(2*61)$. This corresponds to a duty cycle of 49.18% (30*(1/61)) or 50.82% (31*(1/61)). Equations (1) and (2) indicate that the energy of the $61^{st}$ harmonic spur may be minimized at those duty cycles, as shown in FIG. 4, because 30 and 31 are both integers. A similar approach may be applied to other order harmonics that may be generated at other frequencies of interest.

Figure 5:
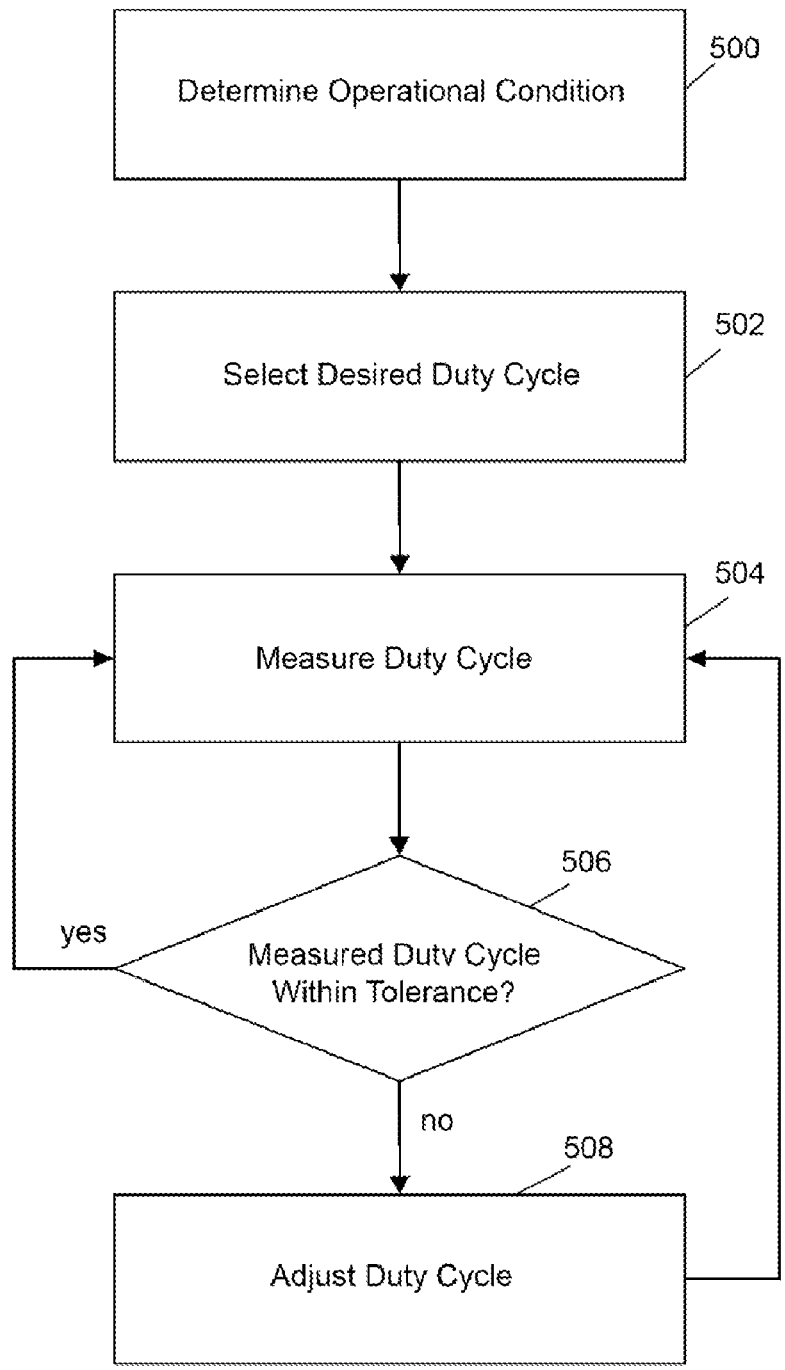
FIG. 5 depicts a flow chart representing a routine for adjusting the duty cycle of a frequency source to minimize spurs, according to the embodiment shown in FIG. 3.

One suitable routine for adjusting the duty cycle of XO 326 is represented by the flowchart depicted in FIG. 5. Beginning with step 500, duty cycle module 328 may determine a current operating condition for wireless communications device 300. In one aspect, the operating condition may be the frequency or wireless channel being used by wireless communications device 300. Other operating conditions may include temperature, supply voltage and the like. Duty cycle module 328 may then select and apply an appropriate duty cycle based upon the operating condition, such as by accessing a look up table (LUT) or other suitable storage means in step 502 to provide open-loop feedback control of duty cycle module 328. Values for the LUT may be determined using any suitable calibration or testing routine as desired. Duty cycle measurement unit 330 may sample the output of duty cycle module 328 to accurately measure the actual duty cycle generated, as represented by step 504. The measurement of duty cycle may be used for feedback control. If the measured duty cycle is within a desired tolerance in step 506, the routine may loop back to step 504 so that duty cycle measurement unit 330 may continue to monitor the duty cycle. Alternatively, if the measured duty cycle is not within tolerance, duty cycle module 328 may be configured to apply a corrective adjustment to the settings in step 508. As shown, the routine may then return to step 504 to measure the duty cycle at the adjusted settings. This cycle may repeat as necessary until the measured duty cycle is within tolerance.

By employing the techniques of this disclosure, an unwanted spur may be significantly reduced in magnitude or prevented entirely. This represents an advantage with respect to conventional spur removal methods that involve filtering as the desired signal is not attenuated to any degree. Further, these techniques do not require any characterization of the coupling path or a modeling of the spur as required for cancellation strategies. The benefits of this disclosure also extend to all potential victims of harmonic spurs, such as power supplies, the receive chain, the transmit chain, or any other combination of inputs and outputs of the various RF stages.

The ability to selectively avoid spurs may also remove constraints from the design of the circuits utilizing the frequency source, allowing optimization for criteria such as for power and area efficiency without being limited by concerns regarding the generation of spurs.

The embodiments disclosed above are representative examples only. The principles of this disclosure can be extended to other applications as desired with appropriate modification. For example, the duty cycle adjustment of a frequency source to minimize spurs has been described in the context of wireless communications devices. However, these techniques may be applied to any electronic circuit employing any frequency source, such as PLLs or the like.

What is claimed is:

1. A method for reducing a harmonic spur comprising:
    operating an oscillating frequency source at a first duty cycle such that the harmonic spur has a first amplitude at the first duty cycle; and
    adjusting the oscillating frequency source to operate at a second duty cycle, such that the harmonic spur has a second amplitude at the second duty cycle, wherein the second amplitude is less than the first amplitude.

2. The method of claim 1, wherein the second duty cycle corresponds to an integer multiple of a reciprocal of an order of the harmonic spur.

3. The method of claim 1, further comprising detecting an amplitude of the harmonic spur and adjusting the second duty cycle until the second amplitude of the harmonic spur is less than a threshold.

4. The method of claim 3, wherein detecting the amplitude of the harmonic spur comprises analyzing an output of a receive chain coupled to the oscillating frequency source.

5. The method of claim 1, further comprising measuring a duty cycle of the oscillating frequency source and adjusting operation of the frequency source until the oscillating frequency source operates at the second duty cycle.

6. An oscillating frequency source comprising a duty cycle module, wherein when operation of the oscillating frequency source at a first duty cycle generates a harmonic spur having a first amplitude, the duty cycle module is configured to adjust the oscillating frequency source to operate at a second duty cycle, such that the harmonic spur has a second amplitude at the second duty cycle, wherein the second amplitude is less than the first amplitude.

7. The oscillating frequency source of claim 6, wherein the second duty cycle corresponds to an integer multiple of a reciprocal of an order of the harmonic spur.

8. The oscillating frequency source of claim 6, further comprising a duty cycle control module configured to detect an amplitude of the harmonic spur and adjust the duty cycle module to operate the oscillating frequency source at the second duty cycle such that the second amplitude of the harmonic spur is less than a threshold.

9. The oscillating frequency source of claim 8, wherein the duty cycle control module is configured to detect the amplitude of the harmonic spur by analyzing an output of a receive chain coupled to the frequency source.

10. The frequency source of claim 6, further comprising a duty cycle measurement unit configured to determine a duty cycle of the oscillating frequency source and the duty cycle module is configured to adjust the duty cycle of the oscillating frequency source until the duty cycle measurement unit determines the oscillating frequency source is operating at the second duty cycle.

11. A method of operating a wireless communications device, comprising:
    operating an oscillating frequency source, wherein energy from the oscillating frequency source couples to a receive chain of the wireless communications device to generate a harmonic spur having a first amplitude when the oscillating frequency source operates at a first duty cycle; and
    adjusting the oscillating frequency source to operate at a second duty cycle, such that the harmonic spur has a second amplitude at the second duty cycle, wherein the second amplitude is less than the first amplitude.

12. The method of claim 11, wherein the second duty cycle corresponds to an integer multiple of a reciprocal of an order of the harmonic spur.

13. The method of claim 11, further comprising detecting an amplitude of the harmonic spur and adjusting the second duty cycle such that the second amplitude of the harmonic spur is less than a threshold.

14. The method of claim 13, further comprising storing the second duty cycle as corresponding to an operational condition of the wireless communications device.

15. The method of claim 13, further comprising retrieving the second duty cycle from storage based on an operational condition of the wireless communications device, wherein the second duty cycle was determined previously.

16. The method of claim 13, wherein detecting the amplitude of the harmonic spur comprises analyzing an output of the receive chain.

17. The method of claim 11, further comprising measuring a duty cycle of the oscillating frequency source and adjusting operation of the oscillating frequency source until the oscillating frequency source operates at the second duty cycle.

18. The method of claim 12, further comprising retrieving the second duty cycle from storage based on an operational condition of the wireless communications device.

19. A wireless communications device comprising:
    a receive chain;
    an oscillating frequency source; and a
    a duty cycle module,
    wherein operation of the oscillating frequency source at a first duty cycle generates a harmonic spur that couples to the receive chain having a first amplitude at the first duty cycle and wherein the duty cycle module is configured to adjust the oscillating frequency source to operate at a second duty cycle, such that the harmonic spur has a second amplitude at the second duty cycle and the second amplitude is less than the first amplitude.

20. The wireless communications device of claim 19, wherein the second duty cycle corresponds to an integer multiple of a reciprocal of an order of the harmonic spur.

21. The wireless communications device of claim 19, further comprising a duty cycle control module configured to detect an amplitude of the harmonic spur and adjust the second duty cycle until the second amplitude of the harmonic spur is less than a threshold.

22. The wireless communications device of claim 21, wherein the duty cycle control module is further configured to store the second duty cycle as corresponding to an operational condition of the wireless communications device.

23. The wireless communications device of claim 21, wherein the duty cycle control module is further configured to retrieve the second duty cycle from storage based on an operational condition of the wireless communications device, wherein the second duty cycle was determined previously.

24. The wireless communications device of claim 21, wherein the duty cycle control module is configured to detect the amplitude of the harmonic spur by analyzing an output of the receive chain.

25. The wireless communications device of claim 19, further comprising a duty cycle measurement unit configured to determine a duty cycle of the oscillating frequency source and wherein the duty cycle module is configured to adjust the duty cycle of the oscillating frequency source until the duty cycle measurement unit determines the oscillating frequency source is operating at the second duty cycle.

26. The wireless communications device of claim 19, wherein the duty cycle module is further configured to retrieve the second duty cycle from storage based on an operational condition of the wireless communications device.

* * * * *